March 29, 1938.  M. S. MACKAY  2,112,704

ARRANGEMENT OF INSTRUMENT DIALS

Filed Aug. 15, 1936

INVENTOR
MALCOLM S. MACKAY
BY
ATTORNEYS

Patented Mar. 29, 1938

2,112,704

UNITED STATES PATENT OFFICE 2,112,704

ARRANGEMENT OF INSTRUMENT DIALS

Malcolm S. Mackay, Englewood, N. J.

Application August 15, 1936, Serial No. 96,166

5 Claims. (Cl. 116—129)

In present day airplanes there are so many instruments requiring the pilot's attention that he has difficulty in keeping them all under proper observation.

An object of the present invention is to arrange several of the more critical instruments with the annular graduated parts of their dials in concentric relationship, and to provide means for adjusting them circumferentially and with relation to each other so that the indicators may be placed in alignment when indicating desired conditions. With such an arrangement the pilot needs only to glance at that group of dials to see whether or not the pointers are in alignment. If they are in alignment, all is well, but if they are out of alignment, he knows that something is wrong and can act accordingly.

Further and other objects and advantages will be apparent from the specification and claims, and from the accompanying drawing which illustrates what is now considered the preferred embodiment of the invention.

Figure 1:
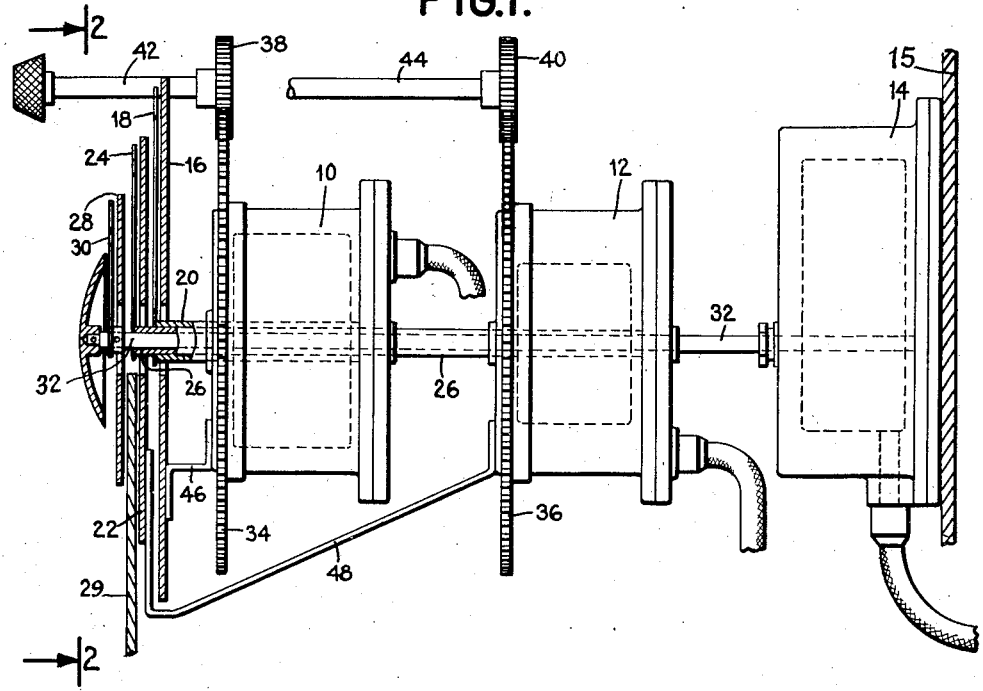
Fig. 1 is a side view, partly in cross-section, showing one arrangement of a group of three instruments according to the invention.

In the drawing, 10 represents a tachometer, 12 a thermometer or temperature gauge, 14 an oil pressure gauge.

16 is the tachometer chart or dial and 18 is the pointer driven by hollow shaft 20 to sweep around the face of dial 16.

22 is the engine temperature dial and 24 is the pointer driven by hollow shaft 26 (within shaft 20) to sweep around dial 22.

28 is the oil pressure dial and 30 is the pointer driven by shaft 32 (within shaft 26) to sweep around dial 28. The relative position of the instrument 14 and its dial 28 need not be changed and, therefore, the dial 28 may be fixed on the face of an instrument board 29 by attaching the same thereto in any convenient manner. The instrument 14 may be secured to a convenient support 15.

Instruments 10 and 12 are provided with gears 34, 36, respectively, by means of which the instruments may be manually rotated about the instrument axis, through the instrumentality of pinions 38 and 40, respectively, on shafts 42 and 44 under control of the pilot. Dial 16 is attached to its instrument 10 by bracket 46, and in like manner dial 22 is attached to its instrument 12 by bracket 48. Thus, whenever instrument 10 or 12 is rotated, the dial is also rotated, and since the pointer also rotates with the instrument, there is no change in the inter-relationship of dial and pointer, but simply an alteration of the rotative position of instrument dial and pointer with reference to the corresponding parts of the other instruments.

Figure 2:
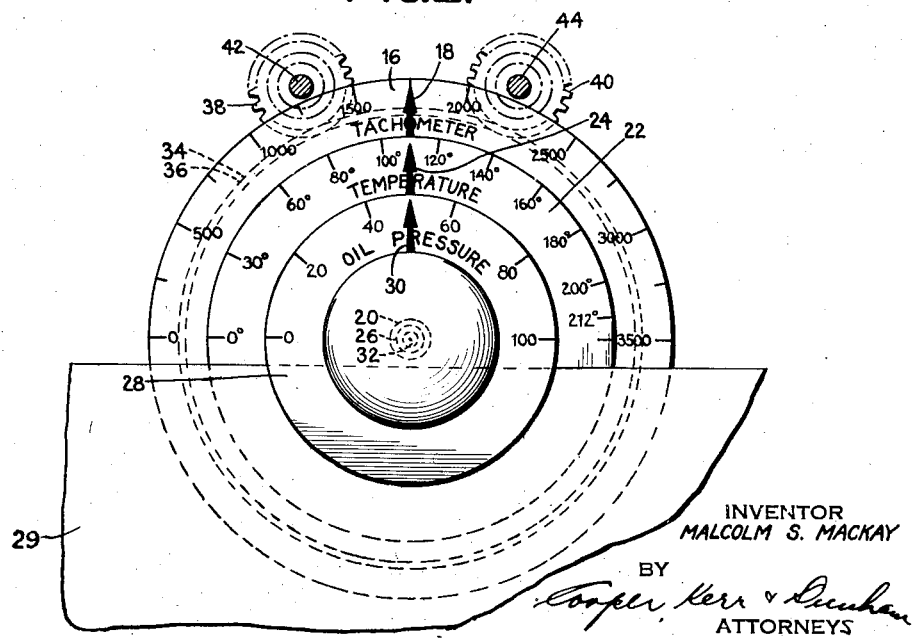
Fig. 2 is a view on line 2—2 of Fig. 1.

In operation, the pilot rotates instruments 10 and 12, if necessary, so that all pointers 18, 24, and 30 will be in alignment (as in Fig. 2) while indicating the desired engine speed temperature and oil pressure. Then during flight, if the pointers should remain in alignment, he knows, at a glance, that his engine speed, engine temperature and oil pressure need no attention. This is true unless all those functions should go wrong simultaneously in the same direction and to the same degree, a circumstance so improbable that it may be dismissed from mind.

In the drawing the oil pressure is shown as 50 and the pointer 30 is vertical with pointers 18 and 24 in alignment therewith. If any other oil pressure be desired, and the oil pressure pointer be moved accordingly to indicate the new pressure, the other two instruments will also be rotated to bring their pointers 18 and 24 into alignment with pointer 30 in its new position, so that, as before, if the pointers are in alignment, all is well.

It is to be understood that the invention is not limited to the specific embodiment herein illustrated and described, but may be used in other ways without departure from its spirit as defined by the following claims.

I claim:

1. An indicating unit having parts comprising a plurality of instrument dials arranged with their faces in planes spaced one behind the other, each of said dials being larger than the one in front of it so as to render a portion of its face clearly visible, the visible portions of said faces having calibrations thereon, a pointer for each dial in operative relationship with the face of said dial, an instrument for each pointer responsive to a condition to be indicated which causes its pointer to move with respect to said instrument and its dial, means operatively connecting each of said pointers to its instrument, and means for supporting said parts in operative relation.

2. An indicating unit having parts comprising a plurality of instrument dials arranged with their faces in planes spaced one behind the other, each of said dials being larger than the one in front of it so as to render a portion of its face clearly visible, the visible portions of said faces having calibrations thereon, a pointer for each dial in operative relationship with the face of said dial, an instrument for each pointer responsive to a condition to be indicated which causes its pointer to move with respect to said instrument and its dial, means operatively connecting each of said pointers to its instrument, manually operable means for relatively moving said dials and pointers for causing said pointers to move into alignment in order to indicate desired conditions, and means for supporting said parts in operative relation.

3. An indicating unit having parts comprising a plurality of concentric instrument dials arranged with their faces in planes spaced one behind the other, a pointer for each dial operatively associated with the face of said dial, an instrument for each pointer responsive to a condition to be indicated which causes its pointer to move relative to said instrument and its dial, means connecting each of said pointers with its instrument, means for manually adjusting said pointers whereby the same may be caused to move into alignment in order to indicate desired conditions, and means for supporting said parts in operative relation.

4. An indicating unit having parts comprising a plurality of concentric instrument dials arranged with their faces in planes spaced one behind the other, common shaft means extending through the faces of said dials, a pointer for each dial rotatable about the axis of said shaft means in operative relationship with the face of said dial, manually operable means for rotating at least one of said dials simultaneously with its associated pointer, and means for supporting said parts in operative relation.

5. An indicating unit having parts comprising a plurality of flight-indicating instruments, a pointer for each of said instruments arranged in planes spaced one behind the other, common shaft means extending through said pointers, means connecting each of said instruments with its pointer whereby said pointers may be rotated about the axis of said shaft means by the instrument connected thereto, means for manually adjusting said instruments and pointers whereby said pointers may be adjusted to cause the same to move into alignment in order to indicate desired conditions during flight, and means for supporting said parts in operative relation.

MALCOLM S. MACKAY.

DISCLAIMER 2,112,704.—*Malcolm S. Mackay*, Englewood, N. J. ARRANGEMENT OF INSTRUMENT DIALS. Patent dated March 29, 1938. Disclaimer filed November 2, 1938, by the assignee, *Bendix Aviation Corporation*.

Hereby enters this disclaimer to claim 5.

[*Official Gazette November 29, 1938.*]